Figure 1:
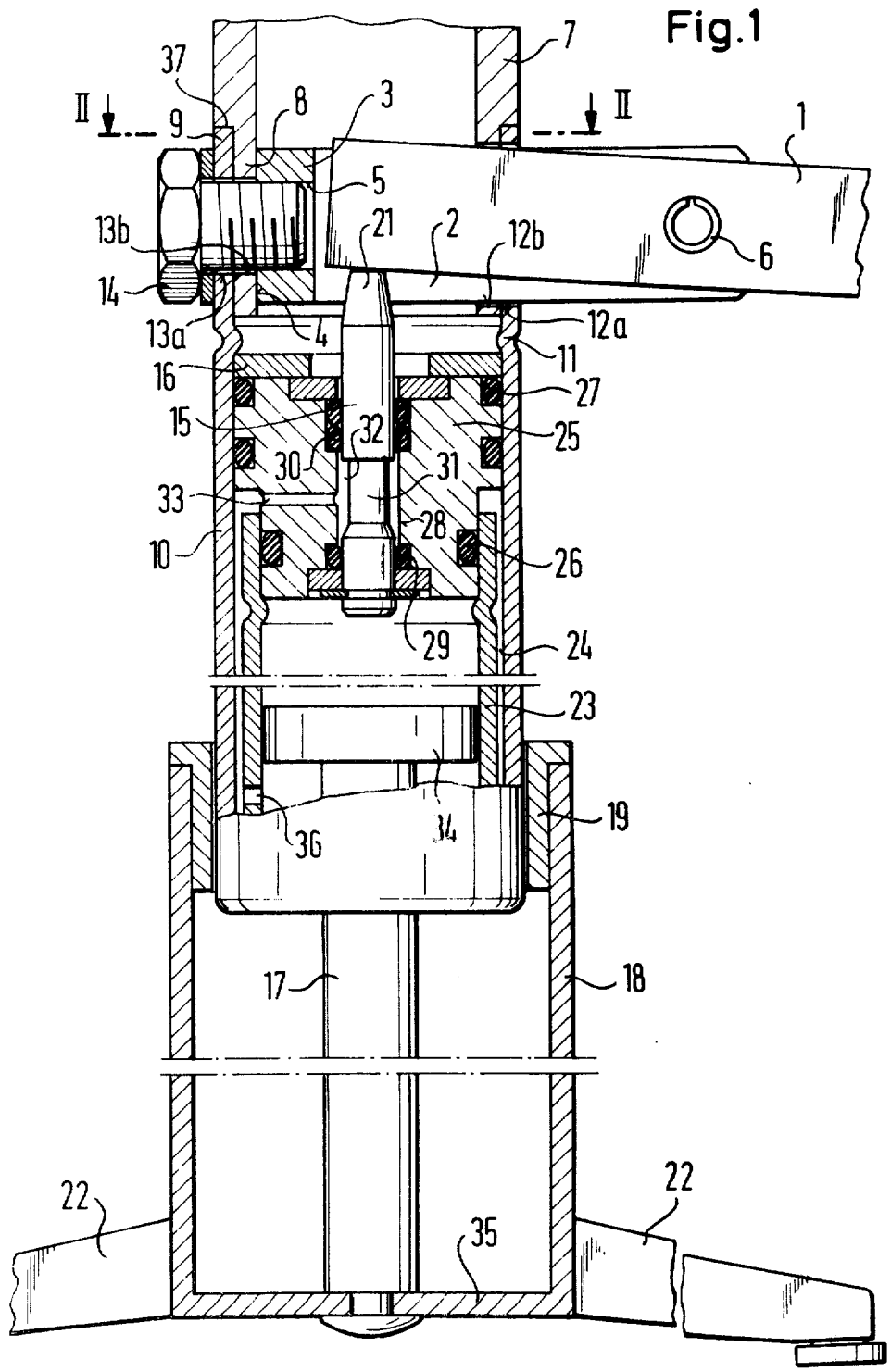

United States Patent
Wirges

[11] 3,921,952
[45] Nov. 25, 1975

[54] TELESCOPING COLUMN ASSEMBLY

[75] Inventor: Winfried Wirges, Koblenz-Moselweiss, Germany

[73] Assignee: Stabilus GmbH, Koblenz-Neuendorf, Germany

[22] Filed: July 1, 1974

[21] Appl. No.: 484,405

[30] Foreign Application Priority Data
July 5, 1973 Germany............... 2334180

[52] U.S. Cl. ............................ 248/404; 248/400
[51] Int. Cl.² .................................... F16M 11/00
[58] Field of Search ........... 248/159, 161, 162, 400, 248/404–412, 414, 354 M; 297/337–339, 345–348; 108/144–148

[56] References Cited
UNITED STATES PATENTS

| | | | |
|---|---|---|---|
| 1,560,279 | 11/1925 | Marks | 248/159 |
| 1,887,233 | 11/1932 | Condos | 248/161 |
| 2,684,129 | 7/1954 | Jaseph | 248/354 H |
| 2,711,209 | 6/1955 | Riabovol | 248/412 |
| 3,711,054 | 1/1973 | Bauer | 248/400 |
| 3,788,587 | 1/1974 | Stemmler | 248/404 |
| 3,790,119 | 2/1974 | Bauer | 248/400 |

FOREIGN PATENTS OR APPLICATIONS

| | | | |
|---|---|---|---|
| 1,958,874 | 5/1971 | Germany | 248/161 |
| 935,958 | 9/1963 | United Kingdom | 108/146 |
| 74,932 | 1/1961 | France | 248/412 |

Primary Examiner—Roy D. Frazier
Assistant Examiner—Lawrence J. Staab
Attorney, Agent, or Firm—Hans Berman

[57] ABSTRACT

A column assembly including two telescopically engaged, coaxial column members whose relative axial movement is releasably prevented by an arresting mechanism in one of the column members. An opening transverse to the axis gives access to the releasing member of the arresting mechanism in the interior of the one column member. A unitary bracket passes through the opening and is fastened to the one column member in the interior thereof. A lever having respective arm portions in the column interior and outside also passes through the opening and is secured to the bracket by a pivot for movement in a plane passing through the releasing member so that the arm portion in the interior of the column may engage and operate the releasing member when the outer arm portion is moved manually.

8 Claims, 2 Drawing Figures

TELESCOPING COLUMN ASSEMBLY

This invention relates to pneumatically extensible support columns, and particularly to a column assembly having telescopically engaged column members and equipped with an improved operating device for release of the arresting mechanism which normally prevents relative axial movement of the column members.

Pneumatically extensible support columns are finding a widening field of application in seats, such as chairs and driver's seats in trucks and other utility vehicles, but also in drafting tables and other pieces of furniture because of the ease with which their length may be adjusted.

An important object of this invention is the provision of a column of the type described which can be assembled quickly and conveniently with an operating mechanism and with a seat or like supporting elements.

With this object and others in view, the column assembly of this invention includes two telescopically engaged column members having a common axis and axially movable relative to each other. A releasable arresting mechanism in one of the column members may prevent relative axial movement of the column members. The mechanism includes a releasing member, and the one column member is formed with an opening transverse to the common axis which gives access to the releasing member. The operating mechanism for the releasing member includes a unitary bracket member passing through the opening and fastened to the one column member in the interior of the same, and a lever member having an arm portion in the interior of the one column member and outside the same. The lever member passes through the opening and is secured to the bracket member by a pivot for movement in a plane which passes through the releasing member for engagement of the arm portion in the column interior with the releasing member.

Figure 2:
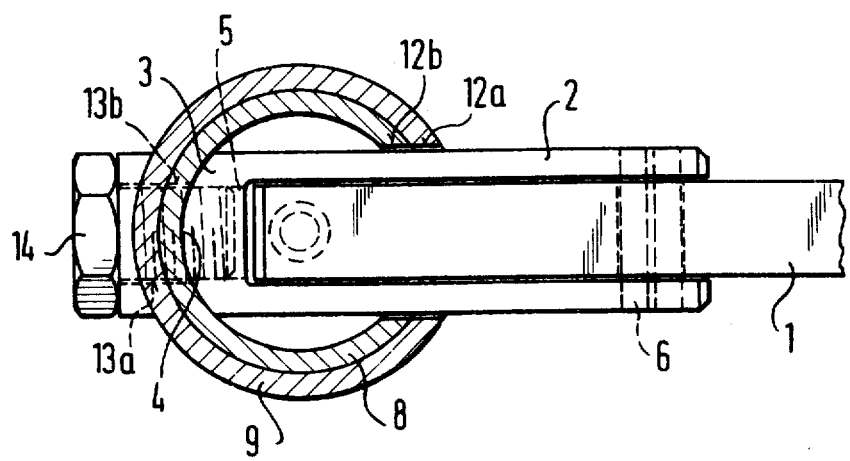

Other features, additional objects, and many of the attendant advantages of this invention will readily be appreciated as the same becomes better understood by reference to the following detailed description of a preferred embodiment when considered in connection with the appended drawing in which:

FIG. 1 shows a chair including a column assembly of the invention in fragmentary elevational section; and FIG. 2 illustrates the chair of FIG. 1 in section on the line II — II.

Referring now to the drawing in detail, and initially to FIG. 1, there is shown only as much of a chair as is necessary for an understanding of the invention. The chair has three legs 22 which radiate equiangularly from the cylindrical, tubular base member 18 of a single, upright support column. The base member 18 is downwardly closed by a radial end wall 35. A sleeve 19 set into the upper, open end of the base 18 slidably receives the top member 10 of the column which is cylindrical over almost its entire length and coaxial with the base member 18. The outer shell 9 of the top portion 10 is a sheet metal tube whose bottom is sealed by an end wall not specifically illustrated and receiving a coaxial piston rod 17 in axially movable, sealing engagement. The outer end of the piston rod is attached to the end wall 35.

A coaxial, cylindrical partition 23 in the shell 9 separates a central chamber in the top portion 10 from a narrow annular conduit 24 radially bounded by the shell 9 and the partition 23, downwardly sealed by the non-illustrated end wall of the shell 9, and upwardly sealed by a plug 25 of stepped cylindrical shape which is sealed to the inner face of the shell 9 by resilient rings 27 and to the inner face of the partition 23 by a sealing ring 26. The plug 25 is axially secured by a flat washer 16 which is backed by an integral, annular rib 11 on the inner face of the shell 9.

A piston 34 slidably engaging the inner face of the partition 23 is mounted on the inner end of the piston rod 17 and axially divides the central chamber in the column portion 10 into two compartments. The lower compartment communicates with the conduit 24 through a radial bore 36 in the partition 23. The upper compartment may be connected to the conduit 24 through axial and radial bores 32, 33 in the plug 25. The central chamber of the column part 10 is filled with air or nitrogen under a pressure much higher than atmospheric pressure.

The bore 32 is sealed from the central column chamber in the illustrated condition of the apparatus by a valve assembly 15 axially movable in the bore 32 and biased outward of the central chamber by the pressure of the confined gas so that a sealing ring 29 on the lower portion 31 of the assembly 15 sealingly engages a shoulder 28 of the plug 25. A releasing member 21 fixedly fastened to the valve portion 31 passes upward and outward of the plug 25 in movable sealing engagement with a packing 30.

Much of the structure described so far and its operation are known from Bauer U.S. Pat. No. 3,656,593. The piston 34 is the principal element of an arresting mechanism which prevents relative axial movement of the column portions 10, 18, as long as the valve assembly 15 seals the bore 32. When the valve is opened, gas may flow between the two compartments on opposite axial sides of the piston 34 so that the column portion 10 may move axially relative to the base portion 18. The gas in the column tends to expand, and therefore to raise the column portion 10 so that less space in the column is occupied by the piston rod 17. Downward pressure applied to the top column portion 10 and adequate to overcome the internal gas pressure shortens the column, and its extended or reduced length may be stabilized by closing the bore 32.

The seat frame of the illustrated chair, not otherwise shown in the drawing, includes an upright tube 7 whose outer diameter is equal to that of the shell 9. The lowermost portion 8 of the tube 7 is of reduced diameter so that it may be inserted into that part of the shell 9 which extends upward beyond the rib 11 until a shoulder 37 on the tube 7 abuts against the annular, radial end face at the upper end of the shell 9. Being equal in external dimension and shape to the shell 9, the seat frame tube 7 appears to be an extension of the column portion 10.

As is better seen in FIG. 2, the tube portion 8 and the axially coextensive portion of the shell 9 are formed with aligned radial, rectangular openings 12a, 12b, and with aligned round passages 13a, 13b diametrically opposite the openings 12a, 12b. A bracket 2, which is a unitary, approximately U-shaped steel member, has two parallel leg portions which pass through the openings 12a, 12b and thereby axially secure the tube 7 to the shell 9. The bright portion 3 of the bracket 2, which connects the leg portions in the interior of the column, has a cylindrically convex outer face 4 which conformingly engages the exposed, inner, concave surface of the tube portion 8 about the passage 13b. The bight portion 3 has an internally threaded bore 5 aligned with the passages 13a, 13b, and a screw 14 freely passes through the passages and threadedly engages the bight portion 3 in the bore 5. The head of the screw 14 is separated by a washer from the outer surface of the shell 9. The screw 14 thus further secures the tube 7 to the shell 9 while also fixedly fastening the bracket 2 in its illustrated position.

A lever 1 is pivoted to the bracket 2 by a split bushing 6 acting as a pivot pin and connecting the two leg portions of the bracket 2 outside the column. One of the arms of the lever enters the interior of the shell 9 through the openings 12a,12b with sufficient clearance to permit some angular movement of the lever under manual pressure applied to the outer lever arm partly omitted from the drawing. The lever 1 swings in a plane which includes the column axis and passes through the releasing member 21. The fully illustrated inner lever arm normally rests on the free end of the releasing member 21 under its own weight. The releasing member 21 may be operated by lifting the partly illustrated outer arm of the lever 1.

Columns including the base portion 18 with its legs 22 and the top portion 10, as well as the internal arresting mechanism and its releasing member 21 are common to many types of supporting structure, and are mass-produced economically. A tube 7 having a lower end of the type shown and described may be cut to a desired length to fit a wide variety of structures which it is desired to support on the column 10, 18, such as seats, table tops, scientific apparatus, to mention but a few. The assembly of the supported structure with the standardized column is quick and simple. The tube portion 8 is inserted into the open top of the shell 9, the bracket 2 is inserted, bight first, through the openings 12a, 12b and fastened by the single screw 14, whereby the tube 7 also is firmly attached to the column. The lever 1 then is inserted in the bracket 2 and fastened by the split bushing 6.

It should be understood, of course, that the foregoing disclosure relates only to a preferred embodiment, and that it is intended to cover all changes and modifications of the example of the invention chosen herein for the purpose of the disclosure which do not depart from the spirit and scope of the invention set forth in the appended claims.

What is claimed is:

1. A column assembly comprising:
   a. two telescopically engaged column members having a common axis and axially movable relative to each other;
   b. releasable arresting means in one of said column members for preventing relative axial movement of said members, said arresting means including a releasing member,
      1. said one column member being formed with an opening transverse to said axis and giving access to said releasing member;
   c. operating means for operating said releasing member, said operating means including
      1. an approximately U-shaped, unitary bracket member having two leg portions passing through said opening and a bight portion in the interior of said one column member, said bight portion connecting said leg portions,
      2. a lever member having respective arm portions in said interior and outside column member, said lever member passing through said opening, and
      3. pivot means securing said lever member to said bracket member for movement in a plane passing through said releasing member for engagement of said arm portion in said interior with said releasing member;
   d. a tubular extension member coaxial with said one column member,
      1. a portion of said extension member being axially coextensive with said one column member,
      2. said one column member and said portion of said extension member being formed with respective aligned passages transverse to said axis; and
   e. a fastening member passing inward of said one column member through said passages and engaging said bight portion in said interior for thereby axially securing said extension member to said one column member and to said bracket member.

2. An assembly as set forth in claim 1, wherein said leg portions are oppositely offset from said plane, and said pivot means include a pivot pin member connecting said leg portions.

3. An assembly as set forth in claim 2, wherein said fastening member is externally threaded, said bight portion being formed with an internally threaded bore engaged by said fastening member.

4. An assembly as set forth in claim 3, wherein said bight portion has an outer face conformingly engaging said portion of said one column member.

5. An assembly as set forth in claim 2, wherein said portion of said extension member is formed with an aperture therethrough transverse to said common axis, said bracket member passing through said aperture and thereby further securing said extension member to said one column member.

6. An assembly as set forth in claim 5, wherein said one column member is tubular, said axially coextensive portion of said extension member being received in said one column member.

7. An assembly as set forth in claim 6, wherein said extension member has an annular shoulder, and said one column member has an annular end face transverse to said axis, said shoulder axially abutting against said end face and thereby limiting movement of said extension member inward of said column member.

8. An assembly as set forth in claim 7, further comprising a plug member axially secured in said interior in a position axially spaced from said bracket member in a direction away from said extension member, said releasing member being mounted on said plug member for axial movement.

* * * * *